United States Patent
Sanders et al.

(10) Patent No.: US 8,050,410 B2
(45) Date of Patent: Nov. 1, 2011

(54) DISTRIBUTED ENCRYPTION METHODS AND SYSTEMS

(75) Inventors: Barry Sanders, Calgary (CA); Travis Beals, Berkeley, CA (US)

(73) Assignee: UTI Limited Partnership, Calgary (CA)

( * ) Notice: Subject to any disclaimer, the term of this patent is extended or adjusted under 35 U.S.C. 154(b) by 1007 days.

(21) Appl. No.: 11/636,427

(22) Filed: Dec. 8, 2006

(65) Prior Publication Data

US 2008/0137868 A1   Jun. 12, 2008

(51) Int. Cl.
*H04L 9/08* (2006.01)
*H04K 1/00* (2006.01)
*H04L 9/28* (2006.01)
*H04L 9/32* (2006.01)

(52) U.S. Cl. ............ 380/278; 380/28; 380/46; 380/263; 713/150; 713/153; 713/168

(58) Field of Classification Search .................. 713/150, 713/153, 168; 380/28, 46, 278
See application file for complete search history.

(56) References Cited

U.S. PATENT DOCUMENTS

| | | | | |
|---|---|---|---|---|
| 5,764,767 | A * | 6/1998 | Beimel et al. ................. | 713/180 |
| 5,812,666 | A | 9/1998 | Baker et al. .................... | 380/277 |
| 6,480,608 | B2 * | 11/2002 | Proctor .......................... | 380/283 |
| 6,810,122 | B1 | 10/2004 | Miyazaki et al. ............... | 380/30 |
| 7,236,597 | B2 | 6/2007 | Elliott et al. ................... | 380/263 |
| 7,398,388 | B2 * | 7/2008 | Xu et al. ........................ | 713/163 |
| 7,457,416 | B1 | 11/2008 | Elliott ............................ | 380/256 |
| 7,512,242 | B2 * | 3/2009 | Pearson et al. ................. | 380/281 |
| 7,620,182 | B2 | 11/2009 | Berzanskis et al. ............ | 380/256 |
| 2002/0131602 | A1 * | 9/2002 | Ishii ............................... | 380/278 |
| 2004/0025018 | A1 | 2/2004 | Haas et al. ..................... | 713/168 |
| 2004/0179686 | A1 | 9/2004 | Matsumura et al. ............ | 380/44 |
| 2004/0184603 | A1 * | 9/2004 | Pearson et al. ................. | 380/28 |
| 2005/0002528 | A1 | 1/2005 | Chen et al. ..................... | 380/255 |
| 2005/0036624 | A1 * | 2/2005 | Kent et al. ...................... | 380/277 |
| 2008/0144836 | A1 | 6/2008 | Sanders et al. ................. | 380/278 |

FOREIGN PATENT DOCUMENTS

WO   WO 2004/086666   10/2004

OTHER PUBLICATIONS

Mihir Bellare, Forward-Security in Private-Key Cryptography, Nov. 2000, M. Joye ed., Springer-Verlag, pp. 1-24.*
Beals and Sanders, "Distributed authentication and relaying for secure networks," Apr. 19, 2006.
Romain Alléaume et al., Topology, architecture and protocols for a quantum key distribution network: workshop on classical and quantum information security, Telecom Paris, Dec. 17, 2005.
International Search Report and Written Opinion issued in International Application No. PCT/US07/25192, mailed Oct. 1, 2008.

(Continued)

*Primary Examiner* — Nathan Flynn
*Assistant Examiner* — Trang Doan
(74) *Attorney, Agent, or Firm* — Fulbright & Jaworski L.L.P.

(57) ABSTRACT

A method and system for providing communication over arbitrary distances with a desired probability of security is disclosed. In accordance with one embodiment of the invention shares of a random key are encoded, the random key for effecting communication of a message through a network employing a cryptographically strong forward security system having a limited effective communications distance. A distributed re-randomization of the encoded shares is then effected at a plurality of intermediate network nodes.

23 Claims, 4 Drawing Sheets

OTHER PUBLICATIONS

Office Action issued in U.S. Appl. No. 11/639,377, mailed Dec. 22, 2009.

Deng et al., "Bidirectional quantum secret sharing and secret splitting with polarized single photons." *Physics Letters A* 337(4-6): 328-334, Apr. 11, 2005.

European Search Report on PCT Application PCT/US2007/025191. Dated Mar. 29, 2011.

Nikov and Nikova, "On proactive secret sharing schemes," *Selected Areas in Cryptograph* 3357:308-325. Aug. 10, 2004.

* cited by examiner

DISTRIBUTED ENCRYPTION METHODS AND SYSTEMS

STATEMENT OF GOVERNMENT INTEREST

This invention was made with government support under a National Defense Science and Engineering Graduate Fellowship awarded by the Department of Defense. The government has certain rights in the invention.

FIELD OF THE INVENTION

Embodiments of the invention relate generally to the field of secure communication systems and more specifically to methods and systems for encrypting communicated content.

BACKGROUND OF THE INVENTION

Cryptographic systems, or cryptosystems, are composed of several cryptographic primitives, such as algorithms for encryption and decryption (ciphers), one-way hash functions, random number generators, authentication algorithms, digital signatures, and key distribution systems. In general, a cryptosystem is only as secure as its weakest component.

Many conventional encryption schemes that provide secure transmission of data (messages) employ an asymmetric encryption such as public-key encryption (PKE).

PKE schemes, such as the Rivest, Shamir, and Adelman (RSA) algorithm, use two keys, a public key known to everyone and a private or secret key known only to the recipient of the message. When the originator of a message (source) wants to send a secure message to a recipient (destination), the source uses the public key of the destination to encrypt the message. The message is then decrypted using the private key of the destination. For public key digital signatures, the sender signs using his or her private key, and the recipient verifies using the sender's public key.

All PKE schemes are based on the fact that key deduction would require a prohibitive amount of time and processing resources. RSA, for example, is based on the lack of efficient schemes for factoring large numbers. Such schemes were once thought to be highly secure, but are now known to be susceptible under certain conditions. For example, RSA and other PKE schemes are vulnerable to particular cryptanalysis techniques employing quantum computers, such as Shor's Algorithm. The only way to increase the security of an algorithm like RSA would be to increase the key size to ensure that keylength exceeds the storage capacity of any foreseeable quantum computer. Such a scheme is impractical and unreliable, given the efficient scaling of Shor's Algorithm and other quantum computer-based cryptanalysis techniques.

The potential vulnerability of current encryption schemes has increased the interest in the development of systems that provide security against conventional cryptanalysis as well contemplated future cryptanalysis techniques. Systems that provide such "cryptographically strong forward security (CSFS)" will include some common attributes. CSFS systems will not use algorithms that are vulnerable to conventional or quantum cryptanalysis. For example, CSFS systems will not employ PKE due to its vulnerability (e.g., Shor's Algorithm). For CSFS systems implementing symmetric encryption, very high key rates—approaching those of one-time pad (OTP)—will be used. CSFS systems will provide a secure manner for key distribution and employ authentication when necessary to prevent man-in-the-middle (MITM) attacks.

For many applications, providing sufficiently high key rates in a secure manner will require some secure means of ongoing key distribution, since it would be impractical to distribute and store the large numbers of keys upfront. Additionally, preventing conventional cryptanalysis and MITM attacks requires a secure replacement for public key cryptography's role in authentication.

If two parties share a small secret key for authentication, they can use quantum key distribution (QKD) as a means of performing ongoing key distribution in a secure manner (other techniques may also be possible). QKD uses fundamental physical properties of quantum systems to provide secure communications. In contrast to PKE schemes that employ mathematical techniques and rely on the computational difficulty of certain mathematical problems (e.g. integer factorization), QKD is based on principles of quantum mechanics (i.e., measurement of a generic quantum state inherently disturbs the state).

Conventional QKD technology is not widely implemented due to two significant disadvantages, which we term the relay problem and the stranger identification/authentication problem.

The Relay Problem

Presently, QKD suffers limitations on the length of a single QKD link. Multiple links can be concatenated to extend the distance, but, if this is done in a naive way, it exposes the system to compromise if any of the intermediate nodes are corrupt. This is referred to as the "relay problem". As mentioned above, QKD is a secure key distribution scheme that in one implementation involves transmitting quantum bits while using quantum mechanics to detect eavesdropping (compromised security). QKD provides security between parties who share a small secret key, which is used for authentication. Practically, however, the quantum bits are transmitted using conventional optical transmission means (e.g., fiber optic cable). Such optic transmission means are subject to losses, which limit the transmission distance. That is, due to the attenuation of light through the transmission media, signals have a practical limitation of approximately 100 km. The use of conventional amplifiers or repeaters would distort or destroy the quantum information. The development of efficient quantum repeaters may extend this distance, but such developments are years away and will require quantum memory and other technically complex features. Moreover, quantum repeaters may not extend the transmission distances enough to develop a practical QKD system.

The relay problem has been addressed, theoretically, with multi-party protocols. Such schemes have their own disadvantages in that any disconnection in the transmission path will result in lost or corrupted information. Moreover, such schemes require 100% trust of the parties, which is typically not a practical assumption.

The Stranger Authentication Problem

A second significant disadvantage of conventional encryption systems such as those employing QKD technology is the stranger authentication problem.

In large networks in which public key cryptosystems cannot be relied upon, a special means for authenticating mutual strangers that do not share secret keys is necessary. While this problem could be addressed with a small number of central authentication servers, this requires all users to completely trust the authentication servers, and imposes enormous communications bandwidth and storage requirements on the servers. This is referred to this as the "stranger authentication problem".

As larger networks implementing CSFS systems are created, it will become increasingly common for parties that do not share a secret key to wish to communicate. Without a shared secret key, such parties cannot authenticate the channel used and are thus vulnerable to "man-in-the-middle" attacks in which an attacker is able to read, insert and modify at will, messages between two communicating parties without either party knowing that the link between them has been compromised.

With these disadvantages, conventional encryption systems including those employing QKD provide only a partial solution to the difficulties posed by the advent of cryptanalysis techniques employing quantum computers.

SUMMARY

In accordance with one embodiment of the invention, shares of a random key are encoded, and the random key is relayed in a distributed fashion through a network employing a CSFS system having a limited effective communications distance. A distributed re-randomization of the encoded shares is then effected at a plurality of intermediate network nodes. The key is then used for the secure transmission of information.

Other features and advantages of embodiments of the present invention will be apparent from the accompanying drawings, and from the detailed description, that follows below.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and system for providing random key distribution in CSFS systems having distance limitations is disclosed. One embodiment of the invention extends the distance limit of a CSFS system to an arbitrary distance employing a network of partially trusted parties.

One embodiment of the invention provides a method for establishing a shared secret key between an originator and a recipient of a digital communication. An embodiment of one such method employs secret-sharing techniques together with a network of partially trusted parties to provide an arbitrarily high degree of confidence in the secrecy of the protocol.

For one such embodiment a plurality of routes from a source node of a network to a destination node of a network are determined. A portion of the determined routes is then selected and shares of a random secret are generated with each share corresponding to one of the routes of the portion of the plurality of routes.

In accordance with one embodiment of the invention, shares of a random key are encoded and the random key is relayed via multiple routes through a network employing a CSFS system. At the destination, shares are recombined to reconstruct the key, and the recipient verifies the integrity of the key with the sender. If the key is intact it is used for authentication or encryption in future communication between the sender and recipient.

In the following description, numerous specific details are set forth. However, it is understood that embodiments of the invention may be practiced without these specific details. In other instances, well-known structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable in a variety of settings in which digital content is communicated through a secure communications network employing QKD or other cryptographic technology having similar properties. One such property is that the system has a limited effective communications distance; that is communications cannot be effectively communicated, directly, between at least two nodes of the network due to the distance between the nodes.

Figure 1:
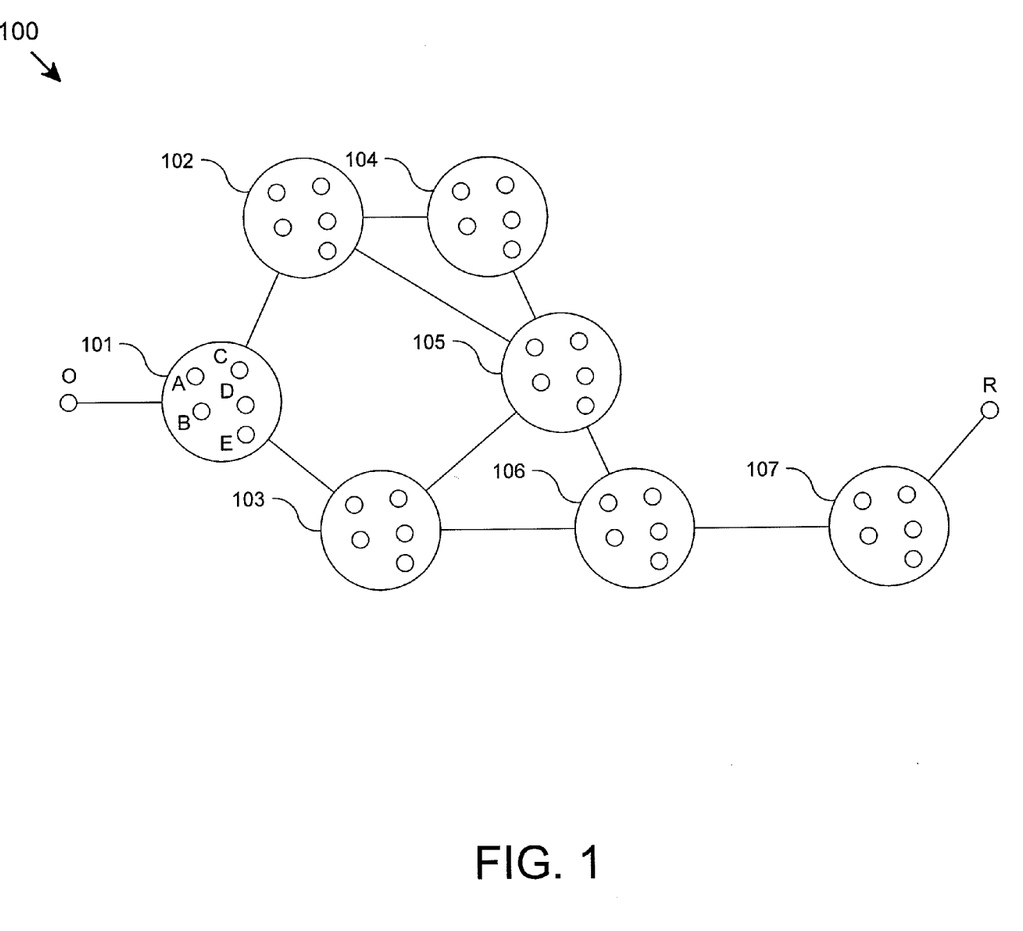
FIG. 1 illustrates a network employing a CSFS system having a limited effective communications distance in which the distance may be extended to an arbitrary distance in accordance with one embodiment of the invention.

FIG. 1 illustrates a network employing a CSFS system having a limited effective communications distance in which the distance may be extended to an arbitrary distance in accordance with one embodiment of the invention. Network 100, shown in FIG. 1, includes a message originating node O and a message recipient node R. Originating node O and recipient node R are separated by a distance greater than the limited distance through which the CSFS system can effectively communicate. For example, for a QKD system, the maximum effective communication distance is approximately 100 km. Network 100 also includes a number of intermediate node clusters 101-107 each of which is within the limited effective communication distance to at least one other intermediate node cluster. Node O and node R are each within the limited effective communication distance of at least one intermediate node cluster (e.g., intermediate node clusters 101 and 107, respectively). Each intermediate node cluster may represent, for example an intermediate city between node O and node R. Each intermediate node cluster contains a number n, of participating nodes, shown for example as nodes A-E of intermediate node cluster 101. For various alternative embodiments, the number n, of participating nodes in each intermediate node cluster may be any number greater than one.

For one embodiment of the invention, each of the network nodes comprises a digital content storage and communication device (e.g., a digital processing system (DPS)). The DPSs that comprise the network may include network servers, personal computers, or other types of digital processing systems. The DPSs are configured to store and communicate a plurality of various types of digital content including e-mails, audio and video clips and multimedia, for example, as well as documents such as web pages, content stored on web pages, including text, graphics, and audio and video content.

The stored digital content may be communicated between the DPSs through any type of communications network through which a plurality of different devices may communicate such as, for example, but not limited to, the Internet, a wide area network (WAN) not shown, a local area network (LAN), an intranet, or the like.

For various practical embodiments of the invention assumptions regarding the characteristics of the network are made. These assumptions may include the following. 1. All network nodes within a node cluster (e.g., a given city) have secure links to each other and that each node cluster is linked to at least one adjacent node cluster. 2. Network nodes within a node cluster can communicate securely with network nodes in adjacent node clusters. 3. Nodes controlled by honest and dishonest parties are distributed randomly throughout the network. 4. Conventional communications channels are lossless (i.e., since it is possible to suppress the loss on such channels using conventional error correction techniques).

Communication Relay

Figure 2:
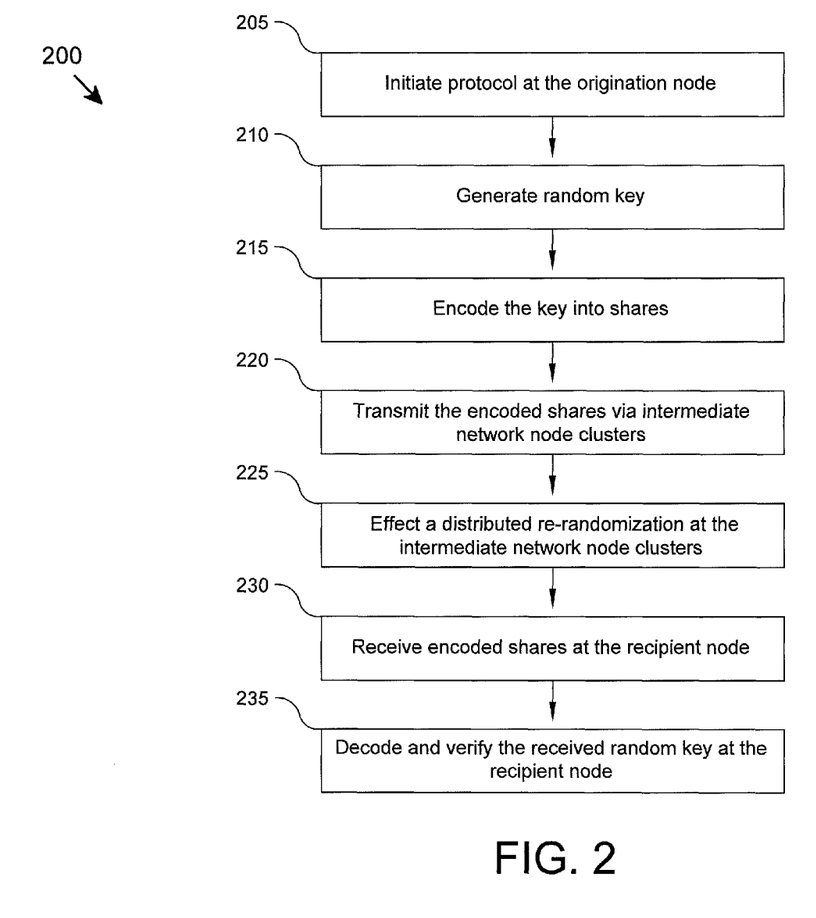
FIG. 2 illustrates a process in which information is communicated over a network employing a CSFS system in accordance with one embodiment of the invention.

FIG. 2 illustrates a process in which information is communicated over a network employing a CSFS system in accordance with one embodiment of the invention.

Process 200, shown in FIG. 2, begins at operation 205 in which the message originator initiates the protocol. For one embodiment the protocol can be initiated when the message originator wishes to transmit a message. In an alternative embodiment, the protocol can be run continuously to generate random keys, which are stored to be used when desired.

At operation 210 a random key is generated. The random key may be generated by the message originator, the message recipient, or at intermediate network nodes (e.g., in a distributed fashion). For one embodiment of the invention, the random key is generated using a CSFS scheme. For one such embodiment, the CSFS scheme used to generate the random key is QKD. For another such embodiment, the CSFS scheme used to generate the random key is a random number generator.

At operation 215 the random key is encoded into shares. For one embodiment of the invention the random key may be encoded into shares using conventional techniques (e.g., Shamir's secret sharing scheme).

At operation 220 the encoded shares are transmitted to network nodes within an intermediate node cluster that is within the limited effective communications distance of the CSFS system.

At operation 225, a distributed re-randomization of the received shares is effected at the intermediate node cluster. Operation 220 and operation 225 are repeated until the encoded shares are received at the recipient node at operation 230.

At operation 235 the received random key is decoded at the recipient node. At this point the recipient and the originator may verify that the received random key matches the generated random key.

The random key may then be used to encrypt messages which may be encrypted using conventional encryption techniques including one time pad, data encryption standard (DES), triple DES (TDES), 2TDES, 3TDES, Blowfish, Twofish, advanced encryption standard (AES) and other symmetric ciphers.

The following example illustrates how a secure communication network employing a CSFS scheme (e.g., QKD) can overcome distance limitations on effective communications in accordance with an embodiment of the invention. Consider an example in which the origination network node and the recipient network node are separated by m intermediate cities each containing n participating parties with trustworthiness t. To achieve good security and low intercity bandwidth usage, Shamir's secret sharing scheme may be used together with a distributed re-randomization of the shares performed by the participating parties in each city. For one embodiment of the invention, the re-randomization process is described as follows.

Let F be some finite field where $|F|>n$, and let $\{x_i | i$ in $\{1 \ldots n\}, x_i$ in $F\}$ be a set of "x coordinates". Both F and $\{x_i\}$ are public and are known to all parties. Let $P_{ij}$ be the $i^{th}$ party in the $j^{th}$ city.

The message originator generates a polynomial $f(x)=s+a_1x+ \ldots +a_{n-1}x^{n-1}$ over F. The coefficients $a_i$ are chosen randomly, while s is the random key that the message originator wishes to send to the message recipient. The message originator then computes n shares $f(x_i)$, and sends them to the parties $P_{i1}$ in the first intermediate city. In all cities except the first and the last the parties in that city perform a distributed randomization protocol to ensure that the shares passed on to the next city are independent of anything less than the entire set of original shares. Within a given city j each party $P_{ij}$ has received a message $f_j(x_i)$, from a party in the previous city. Each $P_{ij}$ computes a polynomial $h_{ij}(x)$ of degree n−1 over F, where all coefficients are random except the y-intercept, which is zero. Each party computes $h_{ij}(x_k)$ for all k in $\{1 \ldots n\}$, and sends $h_{ij}(x_k)$ to $P_{kj}$. Each party then adds all the messages they have received to obtain a new share $$f_{j+1}(x_i) = f_j(x_i) + \sum_{k=1}^{n} h_{kj}(x_i).$$

This new set of shares still encodes the same secret number, s, but is independent of any proper subset of the previous set or shares.

Therefore, in order for the secret number to be compromised there must be some j in $\{1 \ldots m-1\}$ such that for all i in $\{1 \ldots n\}$ at least one of $P_{ij}$ and $P_{ij+1}$ is dishonest. If this is the case, the protocol has been compromised at stage j. For a given j, the probability of compromise is $(1-t^2)^n$, but the probability for j is not entirely independent of the probabilities for j−1 and j+1. Thus, the overall probability $p_s$, of the channel between originator and recipient being secure, can be bounded by $p_s > [1-(1-t^2)^n]^{m-1}$.

Therefore to ensure the probability of a secure channel that is at least to $p_s$, it is sufficient to choose $n=\log(1-p_s^{1/(m-1)})/\log(1-t^2)$. Therefore, embodiments of the invention provide a communication system that overcomes the effective communications distance limitation of some CSFS systems with an arbitrarily small compromise probability.

Further, because intercity bandwidth consumed is proportional to n, the described embodiment provides an cost-effective scaling of resource consumption with communication distance. Thus as shown, embodiments of the invention provide a system in which the bandwidth requirements grow only logarithmically with distance.

Stranger Authentication

Figure 3:
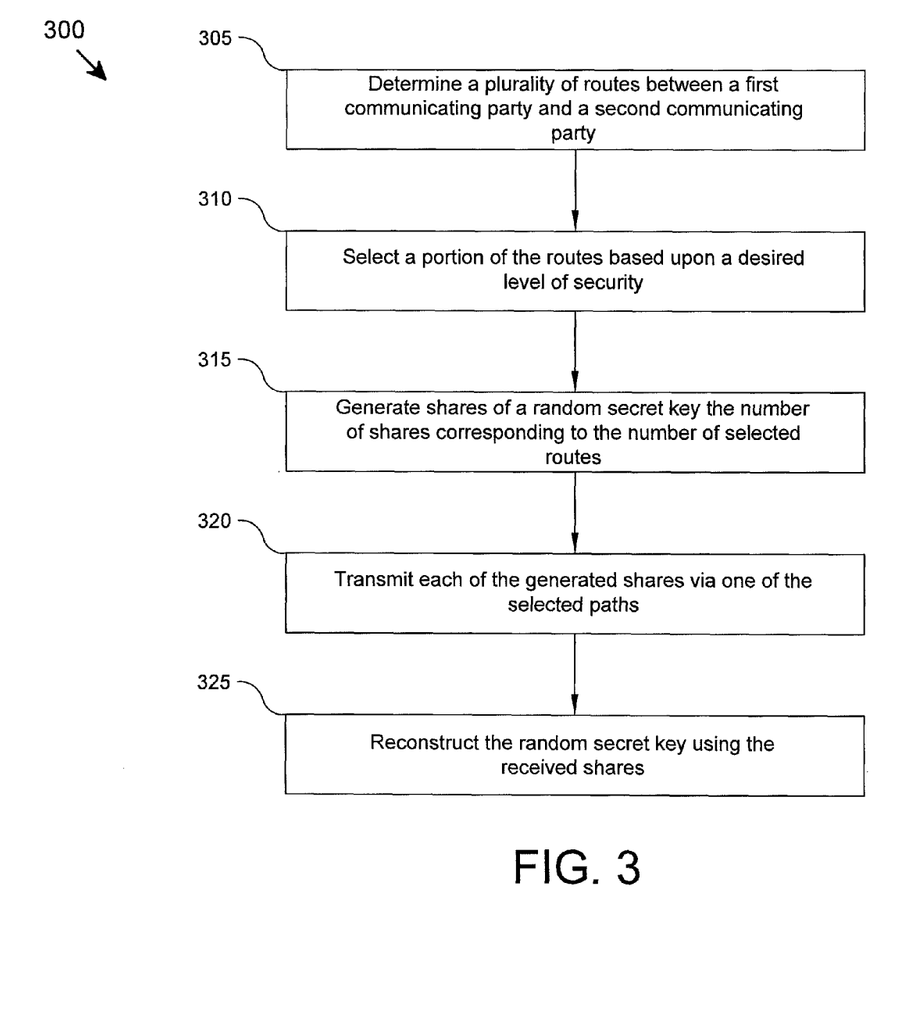
FIG. 3 illustrates a process in which a shared secret key is established between a message originator and a message recipient across a partially trusted network of participants in accordance with one embodiment of the invention.

Large-scale conventional secure communications networks typically employ authentication methods that are either vulnerable to quantum computers and require a trusted central server. Without secure authentication, such systems are susceptible to MITM attacks as discussed above. FIG. 3 illustrates a process in which a shared secret key is established between a message originator and a message recipient across a partially trusted network of participants in accordance with one embodiment of the invention.

Process 300 begins at operation 305 in which the initiating party determines a plurality of routes from a source node of a network to a destination node of the network (i.e., between a first communicating party and a second communicating party). The network may be, for example, network 100 described above in reference to FIG. 1. The number of routes determined may be based on a desired level of security or confidence of either or both of the communicating parties. The determination of routes across the network may be accomplished using a variety of conventional route-determination techniques as known in the art.

At operation 310 the initiating party selects a sufficiently large portion of the determined routes to provide a desired level of security.

At operation 315 a number of shares of a random secret key are generated. The number of shares generated corresponds to the number of routes of the selected subset of the determined routes.

At operation 320 each of the generated shares is transmitted to the other party via one of the selected subset of routes.

At operation 325 the other communicating party receives the transmitted shares and uses the shares to reconstruct the random secret key.

At this point the communicating parties have established a shared secret key. The parties can then verify that they have the same key and take remedial action if the keys do not match.

The following example illustrates how a shared secret key can be established between communicating parties in accordance with one embodiment of the invention. For example, consider two parties A and B who are mutual strangers (i.e., they do not have a shared secret key). A and B are part of a communication network and each has several secure authenticated channels to various other parties who, in turn, have secured authenticated channels to still other parties. The network can be modeled as a random graph G, with V being the set of vertices (participating parties in the network), and $E_G$ being the set of edges (secure authenticated channels). N is the total number of vertices, $|V|$. $V_d$ is the set of vertices representing dishonest or corrupted parties, which are subject to compromise (e.g., due to bribery, blackmail, or subterfuge). G is random in the sense that each possible edge e in $V^2$ is equally probable to be a member of the set of edges $E_G$. A and B can establish a small shared secret key to effect secure communication as follows.

A generates a random of length l, s in $\{0,1\}^l$, which we hereafter refer to as the random secret s. A then determines the number, n, of cycle-free paths between A and B and encodes the random secret s, into n shares. A then transits one of the n shares via each of the n cycle-free paths to B. B receives the n shares and combines them to obtain s'.

A and B may then verify that s=s' and thus establish a shared secret key. If s≠s', then s and s' are discarded and the protocol is repeated. An example of a method by which communicating parties may verify the establishment of a shared secret key in accordance with one embodiment of the invention is included as Appendix A.

If any of the paths contain dishonest parties the communication is subject to a denial-of-service (DOS) attack. To protect the protocol from DOS attacks, the initiating party could employ a conventional (k, n) secret sharing scheme with k<n, thus trading security for robustness against up to n-k dishonest parties. In general, to maximize security, k=n. For one embodiment of the invention a secret sharing scheme for k=n comprises generating n-1 random strings of the same length as the secret. These random strings form the first n-1 shares and the last share (i.e., the $n^{th}$ share) is the result of performing a bit-wise XOR of the first n-1 shares with the secret.

The following is a brief analysis of the security of such a scheme. If one or more paths between A and B contain dishonest parties, those parties can modify the share they receive before passing it on. Such modifications will be detected by the communicating parties during verification of the established shared secret key. The parties can then take remedial action to determine and eliminate the dishonest party or parties before repeating the protocol. Thus only if all possible paths between the parties are compromised can an attacker determine the shared secret key and effect a successful MITM attack. Therefore, the probability of compromised security can be made arbitrarily small by determining how many edges are required to effect a desired security probability. That is, determine the size of $E_G$ such that the subgraph G' induced by $V/V_d$ is connected. Let $t=1-(|V_d|/l)$ be the percentage of honest parties. Suppose we wish to ensure a probability $p_c$ of connection after the vertices $V_d$ have been removed. Let $c=-\log(-\log p_c)/2t$; then the number of edges necessary is $|E_G|=(N/2t) \log tN+(cN/t)$, where the number of edges $|E_G|$ does not exceed the total possible number of edges. The number of shares, n, required for performing the protocol between two arbitrary parties will grow with the total number of paths between them, and thus much faster than the total number of parties. Therefore, for one embodiment, the initiating party may select only a small subset of the total number of possible paths, with the subset selected so as to reduce the probability of a successful attack below a desired threshold.

Therefore, through the use of a sufficient number of paths in a network with sufficiently many edges, the probability of successful attack can be reduced below a desired threshold.

Figure 4:
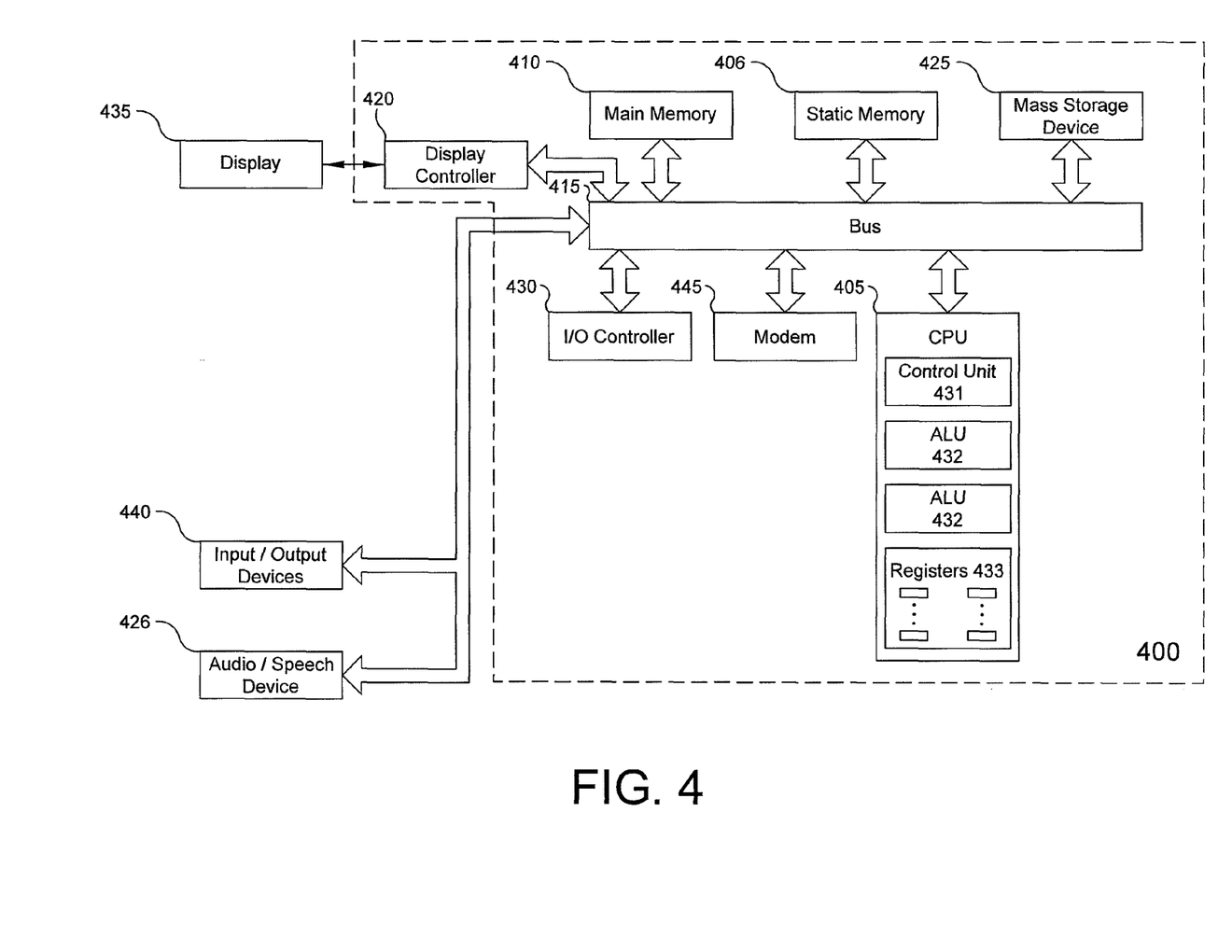
FIG. 4 illustrates a functional block diagram of a digital processing system in accordance with one embodiment of the invention.

As discussed above, embodiments of the invention may employ DPSs or devices having digital processing capabilities as network nodes. FIG. 4 illustrates a functional block diagram of a digital processing system that may be used in accordance with one embodiment of the invention. The components of processing system 400, shown in FIG. 4 are exemplary in which one or more components may be omitted or added. For example, one or more memory devices may be utilized for processing system 400. Referring to FIG. 4, the processing system 400, shown in FIG. 4, may be used as a server processing system. Furthermore, the processing system 400 may be used to perform one or more functions of an Internet service provider. The processing system 400 may be interfaced to external systems through a network interface or modem 445. The network interface or modem may be considered a part of the processing system 400. The network interface or modem may be an analog modem, an ISDN modem, a cable modem, a token ring interface, a satellite transmission interface, a wireless interface, or other interface(s) for providing a data communication link between two or more processing systems. The processing system 400 includes a processor 405, which may represent one or more processors and may include one or more conventional types of processors, such as those made by Motorola or Intel, etc. A memory 410 is coupled to the processor 405 by a bus 415. The memory 410 may be a dynamic random access memory (DRAM) an/or may include static RAM (SRAM). The processor 405 may also be coupled to other types of storage areas/memories (e.g. cache, Flash memory, disk, etc.), that could be considered as part of the memory 410 or separate from the memory 410.

The bus 415 further couples the processor 405 to a display controller 420, a mass memory 425 (e.g. a hard disk or other storage which stores all or part of the application 145, or stored digital content, depending on the DPS), the network interface or modem 445, and an input/output (I/O) controller 430.

The processing system 400 represents only one example of a system, which may have many different configurations and architectures and which may be employed with the present invention. For example, various manufacturers provide systems having multiple buses, such as a peripheral bus, a dedicated cache bus, etc. On the other hand, a network computer, which may be used as a processing system of the present invention, may not include, for example, a hard disk or other mass storage device, but may receive routines and/or data from a network connection, such as the network interface or modem 445, to be processed by the processor 405. Similarly, a portable communication and data processing system, which may employ a cellular telephone and/or paging capabilities, may be considered a processing system that may be used with the present invention. However, such a system may not include one or more I/O devices, such as those described above with reference to I/O device 440.

In the system 400 shown in FIG. 4, the mass memory 425 (and/or the memory 410) may store data that may be processed according to the present invention. For example, the mass memory 425 may contain a database storing previously determined configuration information in accordance with one embodiment of the invention. Alternatively, data may be received by the processing system 400, for example, via the network interface or modem 445, and stored and/or presented by the display 435 and/or the I/O device(s) 440. In one embodiment, data may be transmitted across a data communication network, such as a LAN and/or the Internet.

General Matters

Embodiments of the invention include methods and systems that address the disadvantages of conventional CSFS systems. For one embodiment of the invention, the relay problem is addressed by encoding shares of a random key and effecting a distributed re-randomization of the encoded shares at a plurality of intermediate network nodes.

For one embodiment of the invention, the stranger authentication problem is addressed by determining a plurality of routes from a first communicating party to a second communicating party, generating shares of a random secret key, the number of shares corresponding to the number of the routes, and transmitting each share of the random key via a corresponding route.

Embodiments of the invention have been described as including various operations. Many of the processes are described in their most basic form, but operations can be added to or deleted from any of the processes without departing from the scope of the invention.

The operations of the invention may be performed by hardware components or may be embodied in machine-executable instructions, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer by way of data signals embodied in a carrier wave or other propagation medium via a communication cell (e.g., a modem or network connection). All operations may be performed at the same central cite or, alternatively, one or more operations may be performed elsewhere.

The operations of the invention may be performed by hardware components or may be tangibly embodied in machine-executable instructions stored on a machine-readable medium, which may be used to cause a general-purpose or special-purpose processor or logic circuits programmed with the instructions to perform the operations. Alternatively, the steps may be performed by a combination of hardware and software. The invention may be provided as a computer program product that may include a machine-readable medium having stored thereon instructions, which may be used to program a computer (or other electronic devices) to perform a process according to the invention. The machine-readable medium may include, but is not limited to. Floppy diskettes, optical disks, CD-ROMs, and magneto-optical disks, ROMs, RAMs, EPROMS, EEPROMs, magnet or optical cards, flash memory, or other type of media/machine-readable medium suitable for storing electronic instructions. Moreover, the invention may also be downloaded as a computer program product, wherein the program may be transferred from a remote computer to a requesting computer over a network via a communication cell (e.g. a modem or network connection) and stored on a machine-readable medium. All operations may be performed at the same central cite or, alternatively, one or more operations may be performed elsewhere.

What is claimed is:

1. A method comprising:
   generating a random cryptography key;
   encoding the random cryptography key into a plurality of first shares;
   communicating each first share to one of a plurality of parties in an intermediate node using a cryptographically strong forward security system having a limited effective communications distance;
   generating a plurality of re-randomized shares at each of the parties in the intermediate node, wherein the re-randomized shares, when combined with the first shares, encode the random cryptography key, and wherein the information contained in any subset of the first shares and any subset of the re-randomized shares alone is insufficient to determine the encoded key;
   distributing the plurality of re-randomized shares to the other parties in the intermediate node;
   generating a plurality of intermediate shares by combining the first shares and the re-randomized shares received by each of the parties in the intermediate node;
   transmitting the intermediate shares to a one or more parties in a subsequent node;
   determining the random cryptography key from the set of re-randomized shares; and
   communicating a secure message using the random cryptography key.

2. The method of claim 1 further comprising:
   receiving the encoded shares at a recipient node of the network;
   decoding the encoded shares to obtain the received random key; and
   verifying that the received random key matches the random key.

3. The method of claim 1 wherein the cryptographically strong forward security system utilizes a quantum key distribution system.

4. The method of claim 1 wherein the random key is created using quantum key distribution.

5. The method of claim 1 wherein the random key is created using a random number generator.

6. The method of claim 1 wherein the shares are encoded using Shamir's secret sharing scheme.

7. The method of claim 1 wherein a message is encrypted using the random key.

8. The method of claim 7 wherein an encryption technique for encrypting the message using the random key is selected from the group consisting of one time pad, data encryption standard (DES), triple DES (TDES), 2TDES, 3TDES, advanced encryption standard (AES), Blowfish, Twofish, Serpent, MARS, RC4, RC5 and RC6.

9. A network employing a cryptographically strong forward security system having a limited effective communications distance comprising:
   an origination node configured to:
      generate a random cryptography key;
      encode the random cryptography key into a plurality of first shares; and
      communicate each first share to one of a plurality of parties in an intermediate node using a cryptographically strong forward security system having a limited effective communications distance; and
   one or more intermediate nodes in data communication with the origination node, each intermediate node comprising a plurality of parties configured to:
      generate a plurality of re-randomized shares at each of the parties in the intermediate node, wherein the re-randomized shares, when combined with the first shares, encode the random cryptography key, and wherein the information contained in any subset of the first shares and any subset of the re-randomized shares alone is insufficient to determine the encoded key;
      distribute the plurality of re-randomized shares to the other parties in the intermediate node;
      generate a plurality of intermediate shares by combining the first shares and the re-randomized shares received by each of the parties in the intermediate node; and
      transmit the intermediate shares to a one or more parties in a subsequent node;
   a destination node in data communication with one or more of the intermediate nodes, the destination node configured to:
      determine the random cryptography key from the set of re-randomized shares; and
      communicate a secure message using the random cryptography key.

10. The network of claim 9 further comprising:
    a recipient node for receiving the encoded shares, decoding the encoded shares to obtain the received random key, and verifying that the received random key matches the random key.

11. The network of claim 9 wherein the cryptographically strong forward security system utilizes a quantum key distribution system.

12. The network of claim 9 wherein the cryptographically strong forward security system utilizes a random number generator.

13. The network of claim 9 wherein the random key is created using quantum key distribution.

14. The network of claim 9 wherein the shares are encoded using Shamir's secret sharing scheme.

15. The network of claim 9 wherein a message is encrypted using the random key.

16. The network of claim 15 wherein an encryption technique for encrypting the message using the random key is selected from the group consisting of one time pad, data encryption standard (DES), triple DES (TDES), 2TDES, 3TDES, advanced encryption standard (AES), Blowfish, Twofish, Serpent, MARS, RC4, RC5 and RC6.

17. A non-transitory computer readable media comprising executable instructions, which when executed by a processor, cause the processor to perform a method, the method comprising:
    generating a random cryptography key;
    encoding the random cryptography key into a plurality of first shares;
    communicating each first share to one of a plurality of parties in an intermediate node using a cryptographically strong forward security system having a limited effective communications distance;
    generating a plurality of re-randomized shares at each of the parties in the intermediate node, wherein the re-randomized shares, when combined with the first shares, encode the random cryptography key, and wherein the information contained in any subset of the first shares and any subset of the re-randomized shares alone is insufficient to determine the encoded key;
    distributing the plurality of re-randomized shares to the other parties in the intermediate node;
    generating a plurality of intermediate shares by combining the first shares and the re-randomized shares received by each of the parties in the intermediate node;
    transmitting the intermediate shares to a one or more parties in a subsequent node;
    determining the random cryptography key from the set of re-randomized shares; and
    communicating a secure message using the random cryptography key.

18. The non-transitory computer readable media of claim 17 wherein the method further comprises:
    receiving the encoded shares at a recipient node of the network;
    decoding the encoded shares to obtain the received random key; and
    verifying that the received random key matches the random key.

19. The non-transitory computer readable media of claim 17 wherein the cryptographically strong forward security system is a quantum key distribution system.

20. The non-transitory computer readable media of claim 17 wherein the random key is created using quantum key distribution.

21. The non-transitory computer readable media of claim 17 wherein the shares are encoded using Shamir's secret sharing scheme.

22. The non-transitory computer readable media of claim 17 wherein a message is encrypted using the random key.

23. The non-transitory computer readable media of claim 22 wherein an encryption technique for encrypting the message using the random key is selected from the group consisting of one time pad, data encryption standard (DES), triple DES (TDES), 2TDES, 3TDES, advanced encryption standard (AES), Blowfish, Twofish, Serpent, MARS, RC4, RC5 and RC6.

* * * * *